United States Patent
Petchel et al.

(10) Patent No.: US 7,044,561 B2
(45) Date of Patent: May 16, 2006

(54) ADHESIVE WHEEL BALANCING WEIGHTS HAVING A SERRATED BACKING STRIP

(75) Inventors: Lawrence D. Petchel, New Castle, DE (US); Andrew R. Halko, Smyrna, DE (US)

(73) Assignee: Halko Manufacturing Co., Clayton, DE (US)

( * ) Notice: Subject to any disclaimer, the term of this patent is extended or adjusted under 35 U.S.C. 154(b) by 1 day.

(21) Appl. No.: 10/716,362

(22) Filed: Nov. 18, 2003

(65) Prior Publication Data

US 2005/0104438 A1 May 19, 2005

(51) Int. Cl.
B32B 33/00 (2006.01)

(52) U.S. Cl. ............... 301/5.21; 428/41.8; 428/42.2
(58) Field of Classification Search .......... 301/5.21, 301/5.22; 428/40.1, 41.7, 41.8, 42.2, 43; 40/638

See application file for complete search history.

(56) References Cited

U.S. PATENT DOCUMENTS

| | | | |
|---|---|---|---|
| 2,029,132 A | 1/1936 | Skelton | |
| 2,292,024 A | 8/1942 | Dreher | |
| 2,640,727 A | 6/1953 | Kennedy | |
| 2,765,998 A | 10/1956 | Engert | |
| 2,906,397 A * | 9/1959 | Simmons | 206/447 |
| 3,154,347 A | 10/1964 | Griffith | |
| 3,177,039 A | 4/1965 | Skidmore | |
| 3,267,623 A * | 8/1966 | Block | 451/538 |
| 3,273,941 A | 9/1966 | Skidmore | |
| 3,748,910 A | 7/1973 | Hofmann | |
| 3,786,850 A | 1/1974 | Turoczi, Jr. | |
| 3,825,463 A * | 7/1974 | Amann | 428/41.1 |
| 3,960,409 A | 6/1976 | Songer | |
| 4,121,004 A * | 10/1978 | Ehrlund | 428/43 |
| 4,210,688 A * | 7/1980 | Sato | 428/42.2 |
| 4,300,803 A | 11/1981 | Chorosevic | |
| 4,379,596 A | 4/1983 | Green et al. | |
| 4,390,577 A * | 6/1983 | Brister et al. | 428/42.3 |
| 4,619,253 A | 10/1986 | Anhäuser et al. | |
| 4,728,154 A | 3/1988 | Boyle et al. | |
| 4,793,429 A | 12/1988 | Bratton et al. | |
| 5,039,172 A | 8/1991 | Krieger | |
| 5,344,693 A | 9/1994 | Sanders | |
| 5,547,293 A | 8/1996 | Koch et al. | |
| 5,557,043 A | 9/1996 | Drechsler | |
| 5,770,288 A | 6/1998 | Carney, Jr. | |
| 5,773,110 A | 6/1998 | Shields | |
| 5,831,152 A | 11/1998 | Rothamel | |
| 5,876,817 A | 3/1999 | Mathna et al. | |
| 5,915,274 A | 6/1999 | Douglas | |

(Continued)

FOREIGN PATENT DOCUMENTS

JP 5-131582 * 5/1993

*Primary Examiner*—Russell D. Stormer
(74) *Attorney, Agent, or Firm*—Connolly Bove Lodge & Hutz LLP

(57) ABSTRACT

Disclosed herein is a wheel balancing device having a plurality of wheel balancing weights attached to a top surface of an elongate tape, and a backing strip removably attached to and protecting an adhesive layer on the bottom surface of the tape. The backing strip is serrated below the grooves separating the individual wheel balancing weights to facilitate separation of the individual weights quickly and easily. Each backing strip serration may be in the shape of a lift tab or finger grip to further ease removal of the backing strip from the adhesive layer on the bottom surface of the tape.

13 Claims, 2 Drawing Sheets

U.S. PATENT DOCUMENTS

| | | |
|---|---|---|
| 5,959,205 A | 9/1999 | Yamaya et al. |
| 6,001,441 A * | 12/1999 | Polizzano ................. 428/40.1 |
| 6,106,915 A * | 8/2000 | Ruben ...................... 428/40.1 |
| 6,260,929 B1 | 7/2001 | Oba et al. |
| 6,286,906 B1 | 9/2001 | Nagashima et al. |
| 6,364,421 B1 | 4/2002 | Pursley |
| 6,413,626 B1 | 7/2002 | Wollner |
| 6,449,794 B1 * | 9/2002 | Jaffri ......................... 15/104.2 |
| 6,547,338 B1 | 4/2003 | Gross et al. |
| 6,553,831 B1 | 4/2003 | Schmidt et al. |
| 6,592,188 B1 | 7/2003 | Yamaguchi |
| 6,756,102 B1 * | 6/2004 | Galo ........................... 428/43 |
| 6,756,519 B1 * | 6/2004 | Johnson et al. ............... 602/58 |
| 2003/0154569 A1 * | 8/2003 | McKay ..................... 15/104.2 |

* cited by examiner

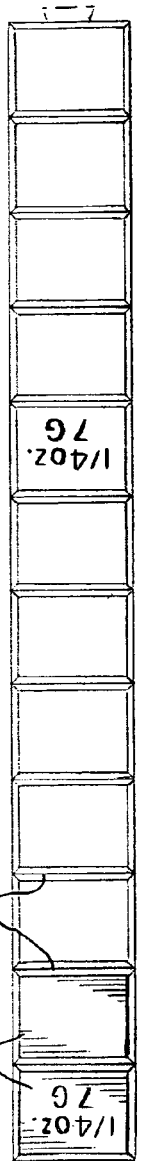
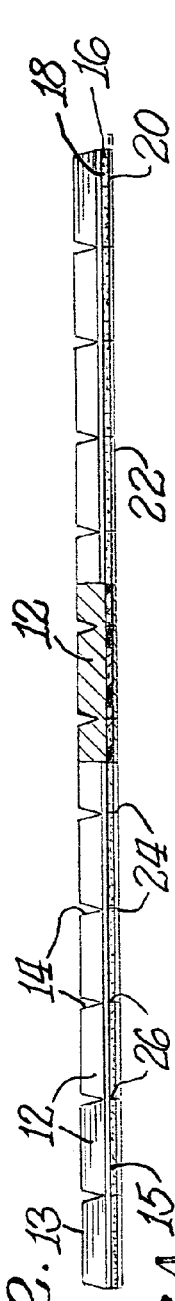
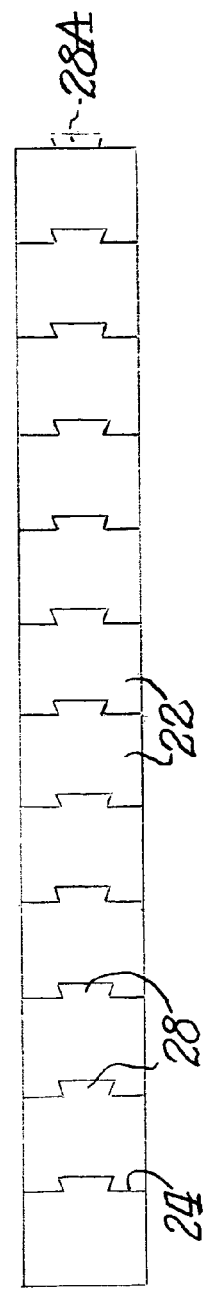
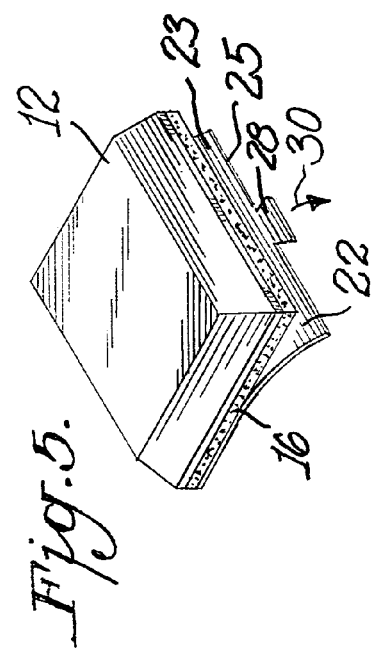
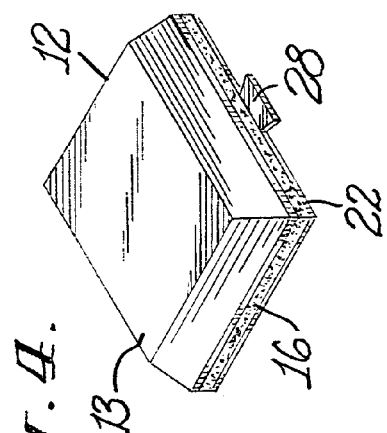

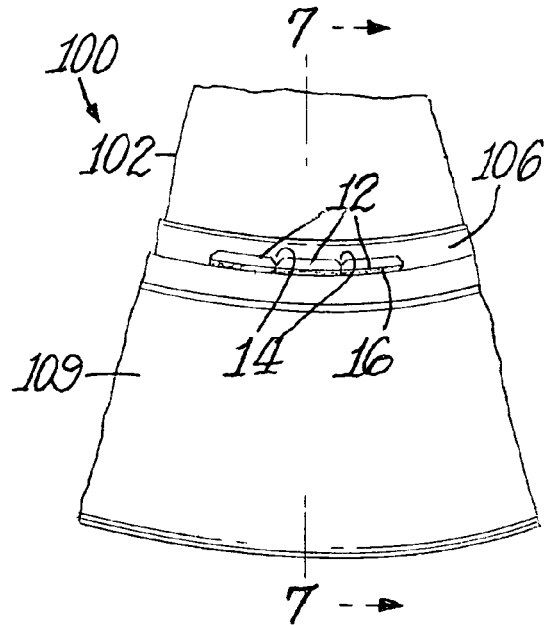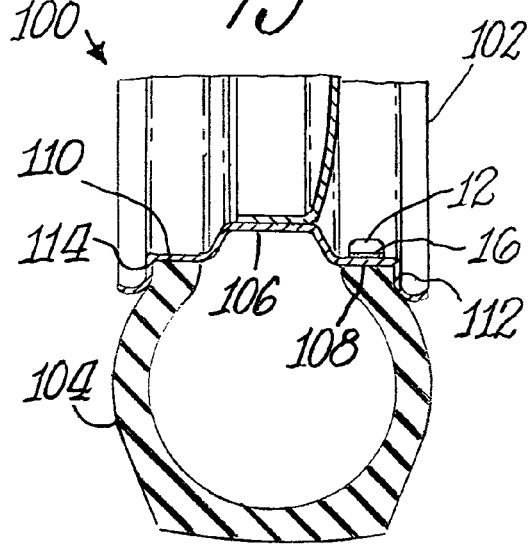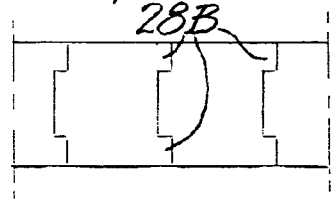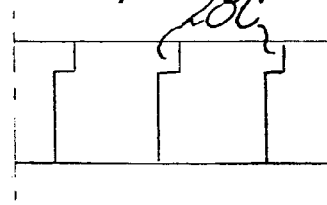

ADHESIVE WHEEL BALANCING WEIGHTS HAVING A SERRATED BACKING STRIP

CLAIM FOR PRIORITY

The present application claims priority of Disclosure Document No. 523251, filed Nov. 15, 2002, the disclosure of which being incorporated by reference herein in its entirety.

BACKGROUND OF THE INVENTION

A. Field of the Invention

The present invention relates generally to wheel balancing devices, and, more particularly to adhesive wheel balancing weights having a serrated backing strip.

B. Description of the Related Art

A number of wheel weight attachment systems have been proposed and used to improve the balance of a rotating wheel having a conventional pneumatic tire mounted thereon. Thus, it is known to apply a counterbalancing weight to a rim of the wheel to compensate for the rotational imbalance of the pneumatic tire and rim assembly.

Conventional counterbalancing weights include lead weights molded around a steel clip, which in turn is attached to a flange of the rim. Such a circumferentially extending weight is selectively placed on the rim at a location generally corresponding to the radial location indicated by the tire balancer. Such clip weights, as they are known, however, result in the contact of two dissimilar metals (that is the steel clip and the rim). In severe winter and salt driving conditions, which form electrolytes, the potential for corrosion exists due to the contact of these dissimilar metals. Clip weights can also potentially damage wheels by inflicting scratches thereon. Such scratches may become noticeable upon removal or relocation of the wheel weight.

Another method of attaching one or more lead weights to a rim is disclosed in U.S. Pat. No. 3,960,409, which discloses a plurality of preformed weights secured upon an elongate tape having an adhesive backing to attach the weights to the rim. A backing strip is removably attached to the adhesive backing of the tape to protect the tape. This backing strip must be removed prior to installation of the lead weights onto the rim. However, it is difficult to remove the backing strip from the tape because the surface area of the backing strip is coextensive with the surface area of the tape, thereby making it extremely difficult to initially separate the backing strip from the tape. A solution to this problem is set forth in U.S. Pat. No. 6,364,421, which discloses a backing strip having a width greater than the width of the tape to facilitate removing the backing strip from the tape prior to installation of the wheel weights onto the rim.

A further problem with the backing strip, not addressed in U.S. Pat. No. 6,364,421, is that a plurality of wheel balancing weights (each weight conventionally weighing 0.25 ounces, or any other weight value) are typically provided in end-to-end relationship upon the elongate strip of tape. However, when balancing a tire, only one or a few wheel balancing weights are needed at a particular radial location of the rim, and the elongate strip of tape typically has at least twelve of such wheel balancing weights. Thus, the backing strip, adhesive tape, and lead weights need to be severed, either by manually bending or breaking the combination at a desired location, or by mechanically severing the combination, such as with a knife, a pair of metal snips, or other cutting tool. The separation of the individual weights becomes a cumbersome and time consuming exercise. Furthermore, some backing strips are made from a vinyl film that is impossible to manually tear, necessitating a knife or a pair of metal snips to cut the vinyl backing strip. Thus, a cutting tool and a cutting step are mandatory for wheel balancing weights having vinyl backing strips.

Conventional wheel balancing device arrangements also promote waste. If the backing strip is peeled away from underneath the individual weights that are to be separated, but also underneath weights that are not to be separated, the adhesive under the non-separated weights will be exposed to grease, dirt, and other debris commonly found on the hands of the applicator and in the storage facility or garage. If the adhesive becomes contaminated with such grease, dirt, or debris, it will not adhere to the rim properly, and the non-separated weights will need to be discarded.

Thus, there is a need in the art for adhesive wheel balancing weights that eliminate waste caused by contaminated adhesive, enables individual weights to be separated quickly and easily, without a cutting tool, and permits the backing strip to be quickly and easily removed from the adhesive tape.

SUMMARY OF THE INVENTION

The present invention solves the problems of the related art by providing a wheel balancing device having a plurality of wheel balancing weights attached to a top surface of an elongate tape, and a backing strip removably attached to and protecting an adhesive layer on the bottom surface of the tape. The backing strip is serrated below the grooves separating the individual wheel balancing weights to facilitate separation of the individual weights quickly and easily. Each backing strip serration may be in the shape of a lift tab or finger grip to further ease removal of the backing strip from the adhesive layer on the bottom surface of the tape.

The wheel balancing device of the present invention eliminates the need for an additional cutting tool to sever the backing strip when individual weights or groups of weights are manually separated from the wheel balancing device. The wheel balancing device also prevents contamination of adjacent adhesive layers of non-separated weights, eliminating waste of unused wheel balancing weights.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a top plan view of a wheel balancing device in accordance with an embodiment of the present invention;

FIG. 2 is a side elevational view partially broken away of the wheel balancing device shown in FIG. 1;

FIG. 3A is a bottom plan view of the wheel balancing device shown in FIGS. 1 and 2, and showing one embodiment of the lift tabs;

FIG. 3B is a bottom plan view of the wheel balancing device shown in FIGS. 1 and 2, and showing another embodiment of the lift tabs;

FIG. 3C is a bottom plan view of the wheel balancing device shown in FIGS. 1 and 2, and showing still another embodiment of the lift tabs;

FIG. 4 is a perspective view of an individual wheel balancing weight of the wheel balancing device shown in FIGS. 1–3, with a tape and backing strip attached thereto and showing a lift tab of the backing strip;

FIG. 5 is a perspective view of the individual wheel balancing weight shown in FIG. 4, and showing the lift tab as peeled away from the tape;

FIG. 6 is a fragmentary side elevational view of the bottom portion of a pneumatic tire and wheel rim upon which a few wheel balancing weights of the wheel balancing device shown in FIGS. 1–3 are mounted; and FIG. 7 is a cross-sectional view taken along line 7—7 of FIG. 6.

DETAILED DESCRIPTION OF EMBODIMENTS OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

A wheel balancing device in accordance with an embodiment of the present invention is generally illustrated in FIGS. 1, 2, and 3A as reference numeral 10. Wheel balancing device 10 may have a plurality of wheel balancing weights 12 mounted in end-to-end relationship upon an elongate strip of tape 16. Each weight 12 includes a top surface 13 and a bottom surface 15. Although FIGS. 1, 2, and 3A show twelve wheel balancing weights 12, any number of weights 12 may be provided on a strip of tape 16 and used in wheel balancing device 10 of the present invention. Preferably, each weight 12 is substantially the same size and weight. For example, in the specific embodiment shown in FIGS. 1, 2, and 3A, each weight 12 may weigh about 0.25 ounces or seven grams. Other magnitudes or sizes of weights 12 may also be provided, preferably in separate strips, and the present invention is not limited to the specific sizes and magnitudes depicted in the Figures.

Wheel balancing weights 12 may be integrally formed in an elongate strip from lead which is preformed into its final desired shape, although weights 12 may be formed from materials other than lead, including but not limited to, zinc, aluminum, stainless steel, etc. The entire external surface of each weight 12 may also be coated with a protective coating made of a polymer material to protect operators handling weights 12 against exposure to lead. Transverse grooves 14, evenly spaced along the strip, may be provided to define the individual weights 12 which may be independently separated from the strip. Preferably transverse grooves 14 do not extend completely through the strip and the remaining material provides a living hinge between adjacent weights 12 which is flexible and adapted to be severed. Preferably weights 12 are separated by manually bending or breaking the hinge since this is the quickest and easiest method. However, weights 12 may be separated by mechanically severing a hinge, such as with a knife or a pair of metal snips, but this is not preferred method due the need for an additional cutting tool.

Alternatively, transverse grooves 14 may extend completely through the strip of weights 12, providing a plurality of independent, unconnected wheel balancing weights 12 secured adjacent to one another on elongate tape 16. Wheel balancing weights 12 may also be individually formed from lead and separately attached to tape 16. Whatever the mechanism of forming the plurality of wheel balancing weights 12, one or more weights 12 may be separated from the remainder of weights 12 on the strip to provide discreet units of wheel balancing weights 12.

Tape 16 includes a top surface 18 and a bottom surface 20. Bottom surface 13 of each wheel balancing weight 12 firmly attaches to top surface 18 of tape 16 by suitable adhesive means, such as an adhesive coating on top surface 18 of tape 16. Bottom surface 20 of tape 16 may also be coated with a suitable adhesive which will bond tape 16 to the rim of a wheel and remain bonded to a portion of the rim suitable to rotationally balance the rim.

Preferably, the present invention utilizes a double-sided, pressure-sensitive adhesive tape as tape 16, which adheres to wheel balancing weights 12 and which can adhere to a rim and thereafter be removed without damaging the wheel surface or leaving substantial adhesive residue. Examples of tapes useful for tape 16 in the present invention are set forth in detail in U.S. Pat. No. 6,413,626, the disclosure of which being incorporated by reference herein in its entirety except where inconsistent with the teachings of the present invention.

To protect bottom surface 20 of tape 16 prior to use of wheel balancing device 10, a generally non-adhesive backing strip 22 is removably attached to bottom surface 20 of tape 16. Backing strip 22 extends the full length of tape 16, and has a top surface 23 adjacent tape 16, as shown in FIG. 5, and a bottom surface 25, as shown in FIG. 4. Backing strip may be made from a variety of materials that render the adhesive portion of tape 16 non-adhesive to protect the adhesive portion from contamination. Such materials include, but are not limited to, a silicone release paper, vinyl, films, papers, powders, foams, inks, polyester materials, other coatings and treatments, and the like.

As best shown in FIGS. 1, 2, and 3A, tape 16 and backing strip 22 preferably have the same lengths and widths as the strip of wheel balancing weights 12 (that is, weights 12, tape 16, and backing strip 22 are coextensive) to provide a uniform, continuous wheel balancing device 10. Thus, tape 16 underlies and adheres to the entire bottom surface 15 of wheel balancing weights 12, and backing strip 22 underlies and adheres to the entire adhesive-containing bottom surface 20 of tape 16. Without more, such a configuration is difficult to use because it is difficult to sever portions of backing strip 22 (especially if backing strip 22 is made of vinyl) and because it is difficult to peel away select portions of backing strip 22 from adhesive tape 16.

The inventors of the present invention have discovered that by providing transverse serrations 24 (either complete serrations or skip serrations) at locations of backing strip 22 underlying transverse grooves 14, one or more wheel balancing weights 12 may be quickly and easily separated from wheel balancing device 10, without the need for a cutting tool. To facilitate manually removing backing strip 22 from tape 16 prior to installation of wheel balancing weights 12 on a rim of a wheel, as best shown in FIG. 3A, each backing strip transverse serration 24 may be in the shape of a dovetail, or offset segment of the serration, to provide a lift tab or finger grip 28. Other shapes are also possible for lift tab 28, including but not limited to square, rectangular, etc. An additional lift tab 28A may or may not be provided at a far end of wheel balancing device 10. Lift tabs 28 may be grasped by the user independently of tape 16 to facilitate removing backing strip 22 from tape 16.

The lift tabs may be provided at a variety of locations, and are not limited to the configurations or locations shown in FIG. 3A. For example, as shown in FIG. 3B, lift tabs 28B may be provided at top and bottom locations. As a further example, as shown in FIG. 3C, lift tabs 28C may be provided at top locations.

Transverse serrations or skip serrations (or grooves) 26 may also be provided at locations of tape 16 that align with transverse grooves 14, as shown in FIG. 2, to facilitate separation of tape 16 when one or more wheel balancing weights 12 are separated from wheel balancing device 10. Tape 16 is normally constructed of a material that typically tears along the hinge created by the manual bending of wheel balancing weights 12 along transverse grooves 14.

FIGS. 4 and 5 show a single wheel balancing weight 12 with its underlying tape 16 and backing strip 22. These Figures further show how lift tab 28 of backing strip 22 extends beyond the edges of wheel balancing weight 12 and tape 16 to enable backing strip 22 to be easily peeled away from tape 16 by pulling lift tab 28 downward, as shown by directional arrow 30 in FIG. 5.

Preferably, transverse serrations 24 do not extend through backing strip 22 along the entire width of backing strip 22 so that if multiple wheel balancing weights 12 are separated from wheel balancing device 10, the entire backing strip 22 underlying the multiple separated wheel balancing weights 12 may be removed prior to application by pulling on a single lift tab 28. Alternatively, transverse serrations 24 may extend through the entire width of backing strip 22, in which case each lift tab 28 underlying the multiple separated weights 12 would have to be pulled individually. Such an arrangement, however, is more time-consuming.

Thus, wheel balancing device 10 eliminates the need for an additional cutting tool to sever backing strip 22 when individual weights 12 or groups of weights 12 are manually separated from wheel balancing device 10. Wheel balancing device 10 also prevents contamination of adjacent adhesive layers of tape 16 located below non-separated weights 12, because transverse serrations 24 provide a clean break between adjacent wheel balancing weights 12, maintaining backing strip 22 below non-used wheel balancing weights 12. This eliminates waste of unused wheel balancing weights 12.

FIGS. 6 and 7 illustrate a plurality of wheel balancing weights 12 mounted on a rim 102 of a vehicle wheel 100, which also includes a pneumatic tire 104 mounted on the rim 102. Rim 102 includes a central well portion 106, an outboard bead receiving flange 108, an inboard bead receiving flange 110, and bead retainer flanges 112, 114. Bead receiving flanges 108, 110 are cylindrical and coaxial with the rotary axis of wheel 100.

To balance wheel 100, one or more wheel balancing weights 12 are removed from the remainder of weights 12 on wheel balancing device 10 by severing backing strip 22, tape 16 and any living hinge or other interconnection between a pair of weights 12 to provide a discreet unit of wheel balancing weights 12 having a desired total weight suitable to balance wheel 100. To install the discreet unit of wheel balancing weights 12, backing strip 22 is removed from tape 16, preferably by grasping lift tab 28 of backing strip 22 and peeling backing strip 22 from tape 16 to expose the adhesive bottom surface 20 of tape 16. Bottom surface 20 of tape 16 is then pressed onto the portion of rim 102 of wheel 100 as desired to rotationally balance wheel 100. As is apparent from the above description, wheel balancing device 10 is extremely versatile and greatly facilitates the use and speed of application of any number of wheel balancing weights 12 to rim 102 of wheel 100.

It will be apparent to those skilled in the art that various modifications and variations can be made in the wheel balancing device of the present invention and in construction of the wheel balancing device without departing from the scope or spirit of the invention, examples of which having been set forth above.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wheel balancing device comprising:
   an elongate continuous tape having a top surface and a bottom surface, the bottom surface of said tape having an adhesive for attaching said tape to a rim of a wheel;
   a plurality of weights attached to the top surface of said tape; and
   an elongate backing strip having a top surface removably attached to the bottom surface of said tape, said backing strip having a plurality of transverse serrations designed to form lift tabs to facilitate removing said backing strip from said tape and retain strip integrity.

2. A wheel balancing device as recited in claim 1, wherein each lift tab is trapezoidal in shape.

3. A wheel balancing device as recited in claim 1, wherein said plurality of weights are formed by providing transverse grooves in an elongate strip of material.

4. A wheel balancing device as recited in claim 3, wherein each transverse serration of said backing strip aligns with a corresponding transverse groove forming said plurality of weights.

5. A wheel balancing device as recited in claim 1, wherein said tape has a plurality of transverse grooves, each transverse groove aligning with a corresponding transverse serration of said backing strip, providing a lift tab when separated.

6. A wheel balancing device as recited in claim 4, wherein said tape has a plurality of transverse grooves, each transverse groove aligning with a corresponding transverse serration of said backing strip and with a corresponding transverse groove forming said plurality of weights.

7. A wheel balancing device as recited in claim 1, wherein said plurality of weights are substantially uniform in configuration.

8. A wheel balancing device as recited in claim 1, wherein said plurality of weights are substantially uniform in mass.

9. A wheel balancing device as recited in claim 1, wherein each of said plurality of weights includes lead and a coating material, the lead being coated by the coating material.

10. A wheel balancing device as recited in claim 1, wherein said tape, said plurality of weights, and said backing strip have substantially the same lengths and widths.

11. A wheel balancing device as recited in claim 1, wherein said tape comprises a double-sided, pressure-sensitive adhesive tape.

12. A wheel balancing device as recited in claim 1, wherein said backing strip comprises a silicone release paper.

13. A wheel balancing device as recited in claim 1, wherein said backing strip comprises vinyl.

* * * * *